Aug. 21, 1951  J. J. ALLEN  2,564,774
MECHANICAL BOLL WEEVIL CATCHER
Filed Aug. 18, 1948  2 Sheets-Sheet 1
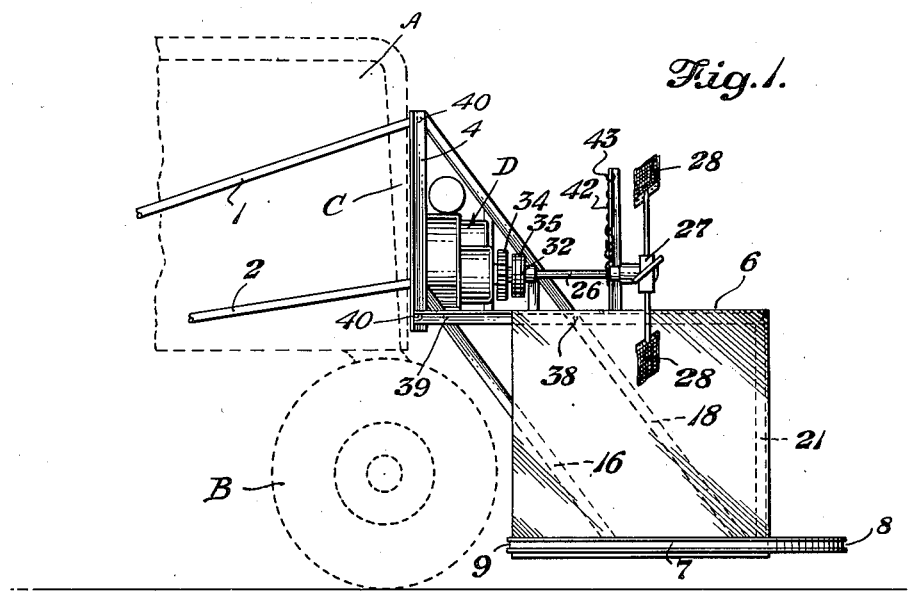
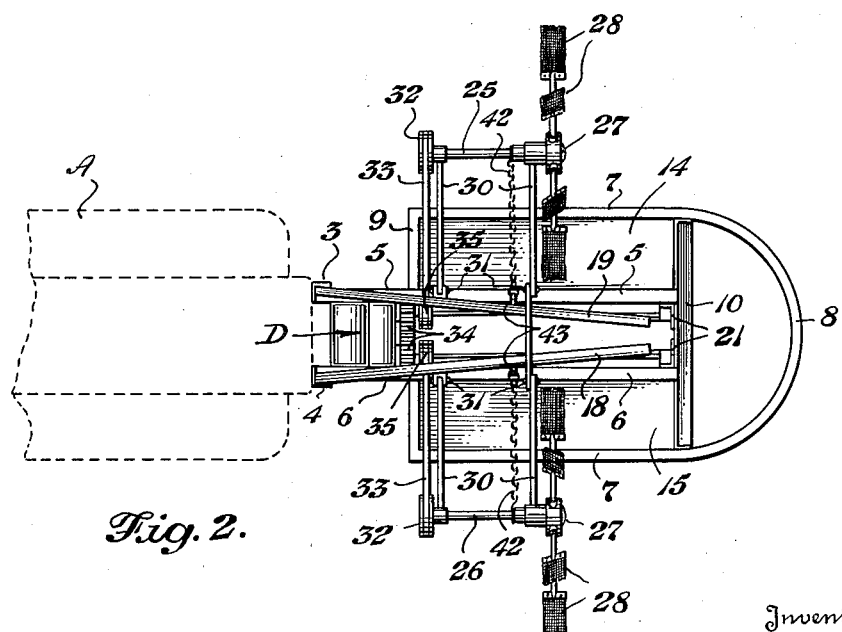
Inventor
Joseph J. Allen,
By Ralph J. Barrett
ATTORNEY Aug. 21, 1951 J. J. ALLEN 2,564,774
MECHANICAL BOLL WEEVIL CATCHER
Filed Aug. 18, 1948 2 Sheets-Sheet 2
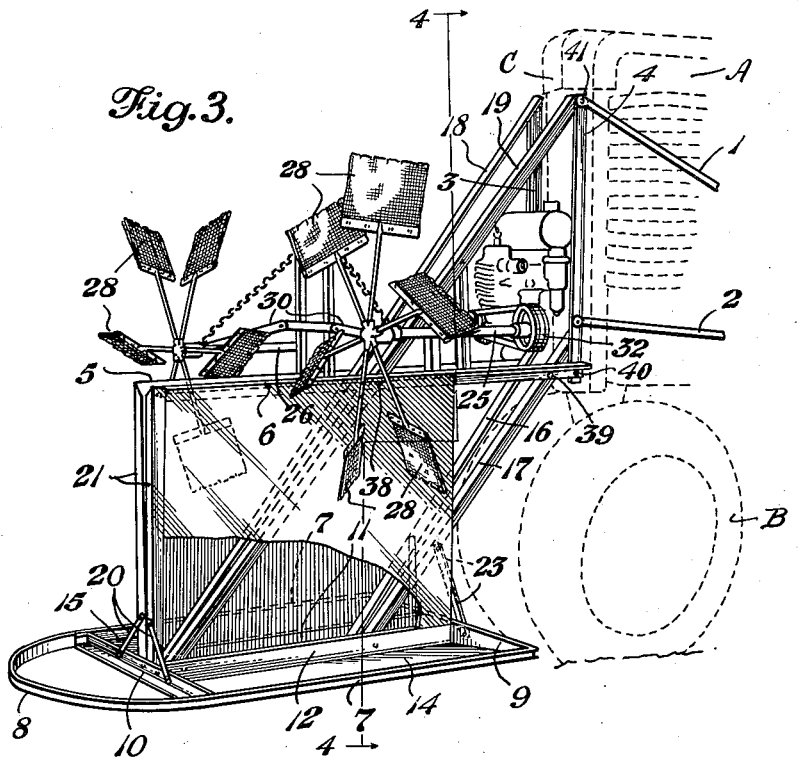
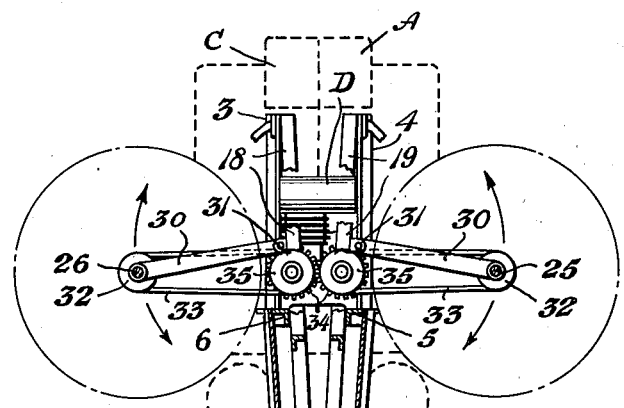
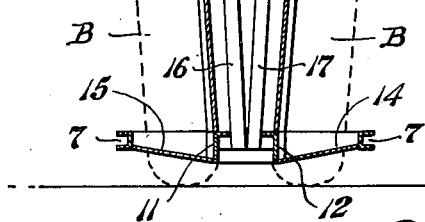
Inventor
Joseph J. Allen,
By Ralph L. Bassett
ATTORNEY Patented Aug. 21, 1951

2,564,774

UNITED STATES PATENT OFFICE 2,564,774

MECHANICAL BOLL WEEVIL CATCHER

Joseph J. Allen, Allendale, S. C.

Application August 18, 1948, Serial No. 44,857

4 Claims. (Cl. 43—138)

This invention relates to improvements in mechanical boll weevil catchers of the general type disclosed in my prior Patent No. 2,153,907, issued April 11, 1939.

The main object of the present invention is to provide a machine of the type in question capable of effectively operating on two separate rows of cotton or similar vegetation, the mechanical parts of which are motor driven.

One of the objects of this invention is to provide a structure, the parts of which are so constructed and arranged, that the assembly may be operably associated with the conventional tractor.

Another object of this invention is to provide a two-row mechanical boll weevil catcher in which the movement of the brushes are synchronized and mounted for adjustment so that the device may be successfully used with two rows of plants of different height.

Another object of this invention is to provide a power plant for the assembly, operated independent of the farm tractor, and designed for variable control independent of the power of the tractor.

Other objects of the invention will more clearly hereinafter appear by reference to the accompanying drawings and specification, wherein like characters of reference designate corresponding parts throughout the several views, in which:

Fig. 1 is a side elevation showing the device attached to a conventional tractor;

Fig. 2 is a top plan view;

Fig. 3 is a perspective view; and

Fig. 4 is a transverse sectional view on line 4—4 in Figure 3.

In the drawings the tractor engine hood is indicated generally by the reference character A, the tractor wheels being shown at B, while the tractor radiator grille or frame is indicated by reference character C.

To the front of the tractor is attached by any suitable means such as stay rods 1 and 2, the vertical frame elements 3 and 4, preferably formed of angle iron although other suitable material may be used in constructing this frame. To the lower end portions of the upright frame elements 3 and 4 are secured the horizontal frame elements 5 and 6 from which is suspended the dual pan structure. The dual pan structure includes an outer frame element 7 of general U-shape form, the front end 8 of which is curved or tapered to facilitate the movement of the structure through the vegetation. A rear end plate 9 connects the inner ends of the frame element 7. A brace 10 is provided immediately at the rear of the forward curved portion 8 of the frame and between the brace 10 and the end frame element 9 are the centrally arranged spaced parallel longitudinal frame elements 11 and 12, these frame elements 11 and 12 forming a rear wall for the plates 14 and 15 which are inclined inwardly and downwardly from the upper marginal edge of the side frame element 7, thus providing pans or receptacles at each side of the assembly for the reception of the insects which are knocked from the plants during the use of the device. The pans formed by the bottom plates 14 and 15 are adapted to receive coal oil or similar insect destroying material.

An upper and lower pair of diagonal braces are provided for connecting the pans with the uprights 3 and 4, the lower diagonal braces 16 and 17 connect the bottom of the braces 3 and 4 with the inner end portions of the central longitudinal walls 11 and 12 while the upper diagonal braces 18 and 19 connect the upper portion of the uprights 3 and 4 with the outer end portions of the walls 11 and 12. Diagonal braces 20 are used for connecting the vertical supports 21 with each end portion of the transverse brace 10 while the diagonal braces or hangers 23 extend for medial points of the lower diagonal braces 16 and 17 and connect the inner end portions of the pans with the braces. These diagonal braces 20 and 23 retain the pan in horizontal position and prevent deflection due to impact with objects with which it may come in contact.

The brushes or beaters are mounted on a pair of spaced horizontal shafts 25 and 26, the beaters being arranged on hubs 27 at the ends of the shafts and being indicated by reference character 28. These beaters 28 may be made of any suitable cloth or material which will be sufficiently stiff to knock the insects from the vegetation without injuring the same, it being understood that the brush structures will be suitably reinforced to give them the necessary strength and life. The marginal edges of the brushes are preferably free to permit deflection upon impact with the vegetation. The shafts 25 are each supported by hinge links 30, these links being connected to the shafts 25 by suitable bearings and being connected to the horizontal frame elements 5 and 6 by means of pivot pins 31 so that the shafts can be raised and lowered to permit the brushes to contact vines of different elevation. The inner ends of the shafts are provided with V-pulleys 32 which are associated with belts 33 through a suitable source of power.

The source of power in the present instance is a gas engine indicated by reference character D, this engine being mounted on a suitable frame and driving through the meshing gears 34 and the pulleys 35 which are fixed to the gears. The V-belts 33 are driven through the pulleys 35 and the gears 34 from the gas engine D to drive the shafts 25 and brushes 28 in opposite directions to deflect the insects from two rows of plants onto the bottom 14 and 15 of the laterally spaced trays defined by the frame elements 7 and 8.

It will be noted that the motor D, which in the present instance is disclosed as a small internal combustion engine, is mounted at the junction of the vertical frame elements 3 and 4 and the horizontal frame elements 5 and 6, this arrangement providing essential bracing to the motor structure to maintain the same with its drive shaft in axial alignment with the driven parts of the boll weevil catcher. The 90° angle between the parts 3 and 4 and the parts 5 and 6 is maintained by the braces 18 and 19 which, while connecting the pan with the upper parts of the uprights 3 and 4, are also secured to the horizontal frame elements 5 and 6 by bolts or other suitable means as indicated at 38. A further bracing of the motor mount structure is provided by the braces 16 and 17 which are secured at 39 to the horizontal frame elements 5 and 6 as well as to the upright elements 3 and 4 as indicated at 40. The upper angle braces 18 and 19 are secured at 41 to the upper extremities of the upright elements 3 and 4. In order to permit the shafts 25 and 26 which carry the beaters to be raised and lowered on their pivots 31, a chain connection 42 is provided, these chains at the outer ends embracing the shafts 25 and 26 and at their inner ends being adapted to have hooking engagement at 43 to the hook members arranged on the horizontal frame elements 5 and 6.

Substantially all of the structure embodies angular framing and similar conventional parts which facilitate manufacture and the parts which are subject to wear can be readily removed and replaced due to the convenient arrangement which makes available the parts for repair or replacement.

What I claim as new and useful and desire to secure by Letters Patent is:

1. In an attachment for a tractor, a frame including standards for attachment to the front end of the tractor, horizontal frame elements extending from the standards, a pair of laterally extending pans underlying said horizontal frame elements and supported thereby, shafts pivotally connected to said horizontal frame elements, beaters rotatably mounted on said shafts, a power plant supported by said horizontal frame elements, driving means connecting said power plant with said shafts, and means for swinging said shafts vertically and locking same in adjusted position.

2. In a boll weevil exterminator, a pair of spaced horizontal frame elements, a power plant mounted on said frame elements, a pair of laterally spaced pans suspended from said frame elements, a pair of shafts driven by said power plant, said shafts being spaced laterally of said pans and being provided with a plurality of radiating beaters, means for driving said shafts in alternate directions to cause the beaters to rotate in clockwise and counter-clockwise directions at opposite sides of the pans, and means for vertical adjustment of said shafts to raise or lower the beaters for operation on plants of varying height.

3. In a boll weevil exterminator for use in association with a tractor, in combination with a frame adapted to be connected to the forward end of said tractor, said frame including forwardly projecting frame elements, pans arranged in suspended relation to said frame elements and projecting alternately therefrom, a pair of reversely rotating beater elements including shafts therefor, hinge members for supporting said shafts whereby the beater elements on said shafts may be raised or lowered, a power plant supported by said frame elements, and flexible drive means between said power plant and said beater shafts.

4. A boll weevil catcher attachment for use in connection with a power driven tractor, a frame adapted to be connected to the front of the tractor, horizontal supporting elements, diagonal braces secured to said frame and said horizontal supporting elements to maintain them in spaced relationship, a power plant supported by said frame, a shaft, a beater arranged at one end of said shaft, a hinged element supporting said shaft to permit its swinging movement with relation to the frame, means for locking said shaft in adjusted position, flexible means for driving said shaft by said power plant, and a pan supported by said supporting elements.

JOSEPH J. ALLEN.

REFERENCES CITED

The following references are of record in the file of this patent:

UNITED STATES PATENTS

| Number | Name | Date |
|---|---|---|
| Re. 15,384 | Luedke | June 13, 1922 |
| 1,668,064 | Freud | May 1, 1928 |
| 1,880,262 | Lauppe | Oct. 4, 1932 |